L. E. VASSEUR AND M. TCHOUBRITCH.
ANTISPLASH GUARD FOR MOTOR VEHICLES
APPLICATION FILED APR. 26, 1919.

1,377,035.

Patented May 3, 1921.
3 SHEETS—SHEET 1.

INVENTORS
LUCIEN EMILE VASSEUR
MICHEL TCHOUBRITCH
BY
ATTORNEYS

L. E. VASSEUR AND M. TCHOUBRITCH.
ANTISPLASH GUARD FOR MOTOR VEHICLES
APPLICATION FILED APR. 26, 1919.
1,377,035.
Patented May 3, 1921.
3 SHEETS—SHEET 2.
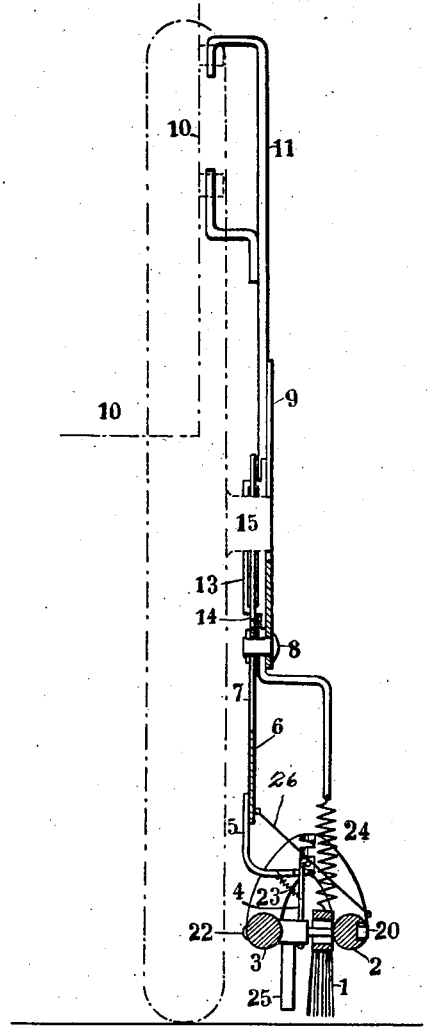
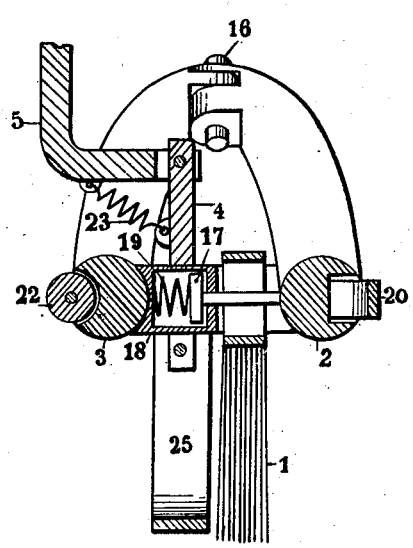
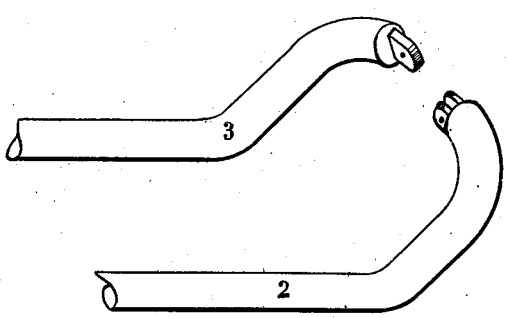
INVENTORS
LUCIEN EMILE VASSEUR
MICHEL TCHOUBRITCH
BY
ATTORNEYS

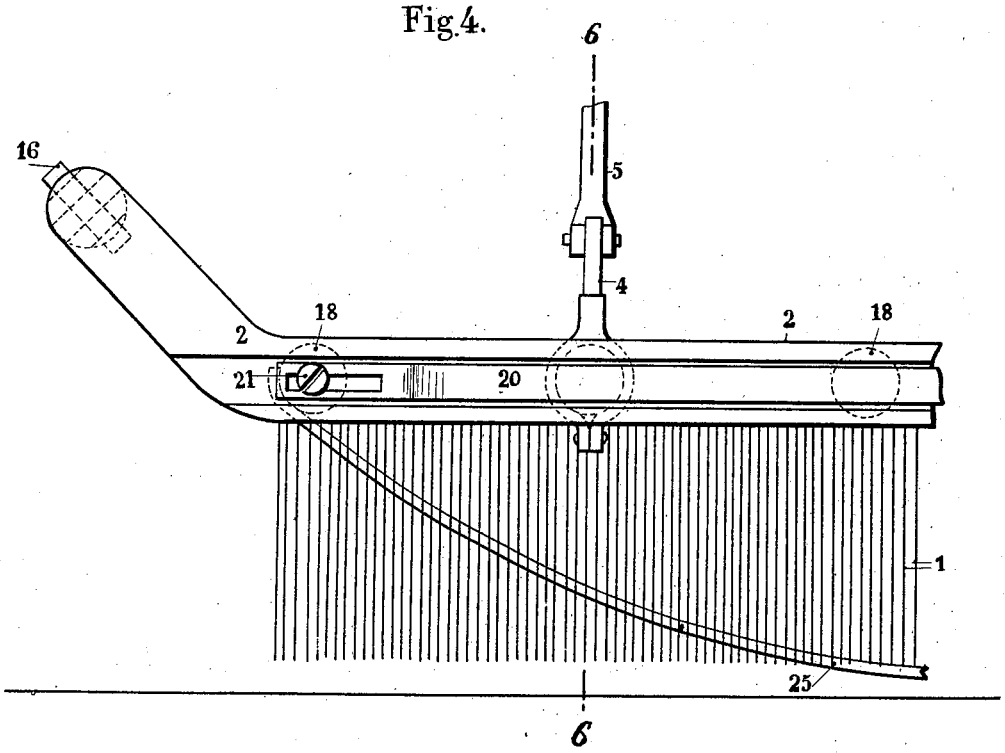
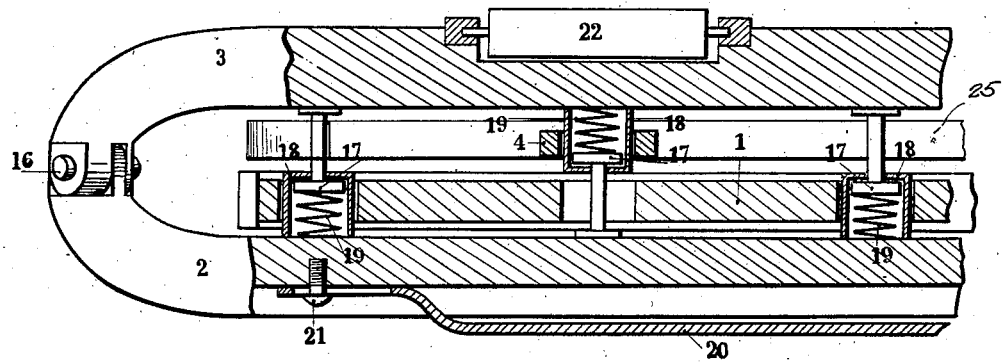

UNITED STATES PATENT OFFICE.

LUCIEN EMILE VASSEUR AND MICHEL TCHOUBRITCH, OF VIROFLAY, FRANCE.

ANTISPLASH-GUARD FOR MOTOR-VEHICLES.

1,377,035.  Specification of Letters Patent.  Patented May 3, 1921.

Application filed April 26, 1919. Serial No. 292,911.

*To all whom it may concern:*

Be it known that we, LUCIEN EMILE VASSEUR, of Viroflay, Seine-et-Oise, France, electrician, and MICHEL TCHOUBRITCH, of 62 Rue du Louvre, Viroflay, Seine-et-Oise, France, engineer, have invented an Anti-splash-Guard for Motor-Vehicles, of which the following is a clear, full, and exact description.

The object of the present invention is an "anti-splash" guard, for motor vehicles, essentially characterized by the feature that the brush, intended to prevent the splashing of the liquid mud outward, is carried in a frame suspended from two vertical arms hinged on a plate which is adapted to move vertically and to swing, in the vertical plane, on a plate secured to the chassis of the vehicle by rigid arms which also support the brush frame by means of springs.

This brush frame is formed of two bars, which are bent and are turned up at the ends to enable them to be hinged together and form a flexible frame which is held in its open position by spring pistons inserted between the two bars of the frame, said spring pistons acting as buffers in the event of the frame striking against the curb of the sidewalk. One of the component bars is also provided with a flat spring which also serves to absorb transverse shocks; while the other bar is provided with rollers, which, in the event of a powerful transverse shock, will make contact with the wheel and prevent the frame and brush from being dragged forward by the latter. Moreover, the said frame is provided with a flexible skid, formed of a curved plate spring, which is intended to raise the frame and brush and cause the entire anti-splash device to oscillate in the vertical plane on coming into contact with any hump or projection on the road.

Finally, the whole of the upper portion of the brush frame is covered with a waterproof fabric which prevents the splashing of the water or mud in the upward direction.

The drawings illustrate, solely by way of example, an anti-splash guard according to the invention.

Fig. 3 is a vertical cross section along the line 3—3 of Fig. 1;

Fig. 4 is a partial side elevation of the frame carrying the brush, showing the means of suspension;

Figure 1:
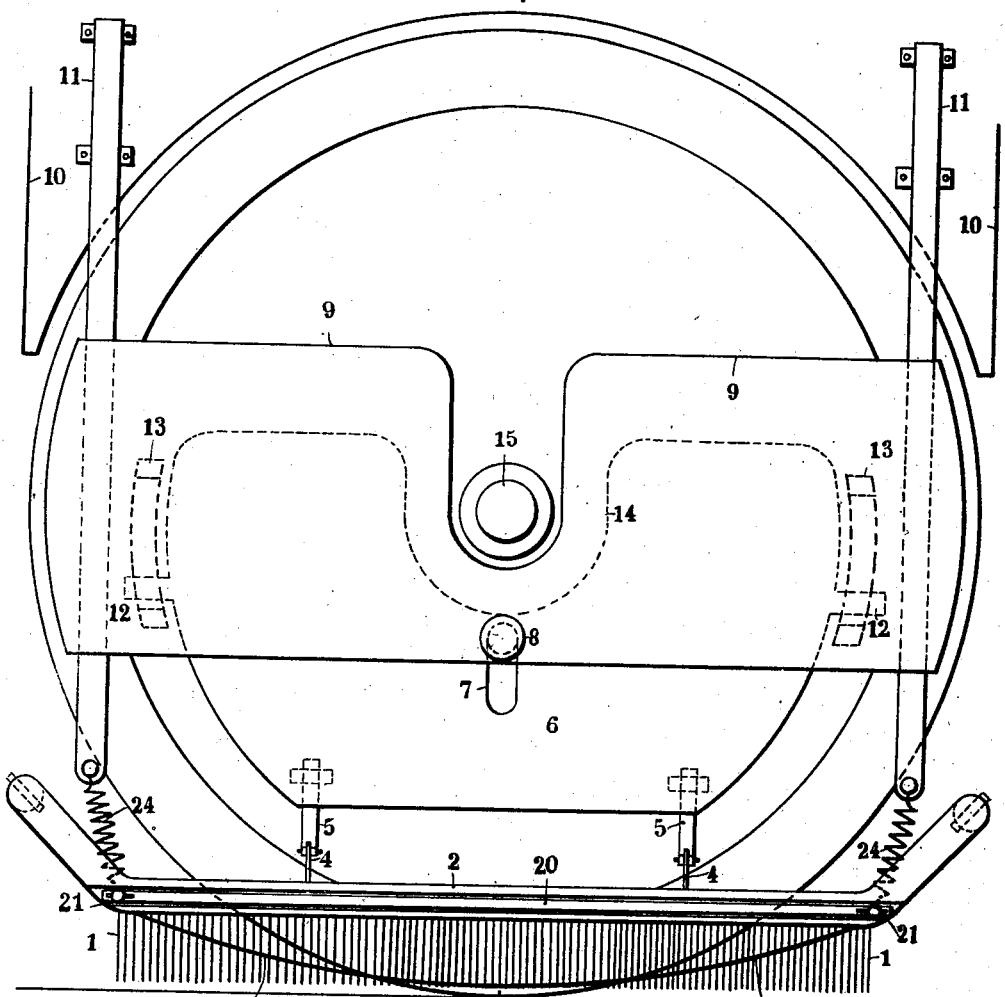
Figure 1 is a side elevation of the device.
Figure 2:
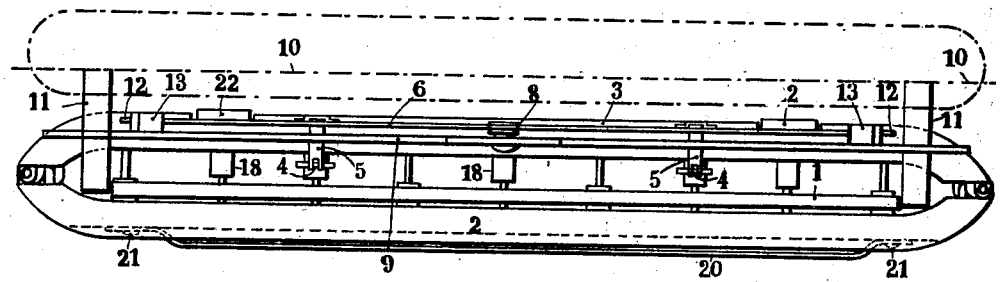
Fig. 2 is a corresponding plan with the half spring removed.

Fig. 5 a plan view partly in section, of Fig. 4;

Fig. 6 a vertical cross section along the line 6—6 of Fig. 4; and

Fig. 7 shows, in perspective, the details of the two branches of the brush frame.

As shown in the drawing, the anti-splash guard comprises a brush 1, carried, as will be hereinafter described, by a frame, formed by two bars 2 and 3 and supported by rods 4 which are pivoted on brackets 5 secured on a movable plate 6.

The plate 6 is provided with a vertical slot 7 engaging with a stud 8 projecting from a carrier plate 9 rigidly secured on the chassis 10 by means of vertical bars 11.

The plate 6 is also provided with lugs 12 which engage in guides 13 on the plate 9, and it is cut away at 14 so as to fit against the hub 15 of the wheel.

The result of this arrangement is that the plate 6, which carries the brush frame, is able to move vertically and oscillate on the stud 8 when the brush frame is suddenly lifted (while the vehicle is running) by contact with a projection or any obstacle on the road.

The bars 2 and 3 forming the brush frame are bent upward and then horizontally, as shown in Fig. 7, and are joined together by means of a pivot pin 16.

Each of these bars is provided, on the inner side, with a certain number of pistons 17 working in cylinders 18 on the other bar, and subjected to the action of springs 19 housed in said cylinders (Figs. 5 and 6).

The object of these spring pistons is to keep the hinged frame 2—3 normally in the open position, and to act as buffers in the event of a transverse shock through the frame striking against the edge of the sidewalk, for example, since they enable the frame to close to an extent depending on the violence of the impact.

The outer bar 2 of the brush frame is also provided with a plate spring 20, which is also intended to lessen the force of lateral shocks, for which purpose the slotted ends of the spring are engaged by screws 21 on the bar 2.

On the side facing the wheel of the vehicle, the other bar 3 carries rollers 22, mounted on horizontal axes, in order to prevent the anti-splash guard from being dragged onward by the wheel, when the guard is forced into contact with the latter by a transverse thrust.

The anti-splash device, constructed as described, is held in a vertical position by springs 23 attached, on the one hand, to suspension rods 4 on the frame, and on the other to brackets 5 secured on the movable plate 6. These springs 23 pull the brush 1 back into position automatically if, from any cause, the brush has been forced outward.

The two ends of the frame 2—3 are supported by the rods 11, carrying the fixed plate 9 by means of spiral springs 24, which pull the brush frame back into its proper position when it tends to drag in consequence of prolonged energetic contact with, for instance, the edge of the sidewalk.

Finally, a leaf spring 25, of suitable curvature, is attached to the pistons 17 of the end cylinders 18 of the frame 2—3, for the purpose of lifting the frame and brush in the event of striking against an obstacle on the road.

In order to prevent the splashing of water upward, a waterproof fabric 26 is secured, on the other hand, along the bar 2, and on the other to the lower part of the plate 6, as shown in Fig. 3.

From the foregoing it will be evident that, when the vehicle is running normally, the members composing the anti-splash guard occupy the position shown in the drawing, and that, if the guard comes in contact with an obstacle of any kind, the spring 25 progressively lifts the brush frame and the plate 6, which slides or oscillates on the stud 8 of the fixed plate 9 according to the way in which it is displaced.

If any obstacle pushes the brush outward, the rods 4 swing on the brackets 5, and strain the springs 23, so that when the obstacle is passed, these springs pull the guard back into its proper position.

If the brush frame is squeezed against the edge of the sidewalk, the spring 20 yields at first, and then if the pressure continues, the brush frame closes, compressing the buffer springs 19.

Finally, if the pressure is prolonged, the rods 4 swing inwardly and draw the brush frame until the rollers, carried by the bar 3 of said frame, bear against the outer face of the wheel, whereupon the rollers 22 revolve and prevent the brush frame from being dragged onward by friction.

As soon as the pressure is removed, the various springs cause the several constituent parts to return to the normal position.

The anti-splash guard described above is, of course, given solely by way of example, and it will be evident that the shape, materials and dimensions may be varied without departing from the spirit of the invention.

Claims:

1. An anti-splash guard comprising a frame formed of parallel side bars bent upward and inward at the ends, said ends being connected together by pivots disposed angularly to permit the relative yielding of the side bars; spring pistons between the side bars of the frame; a brush mounted in said frame; and means for supporting the said brush frame on a movable plate mounted on a second plate secured to the chassis of the vehicle.

2. An anti-splash guard comprising a brush frame composed of side bars bent upward and inward at the ends, said ends being connected together by pivots arranged to permit yielding of the side bars toward and away from one another; spring pistons between the said side bars of the frame; a brush mounted in said frame, said frame being supported by rods pivotally mounted on brackets secured to a movable plate mounted on a second plate stationarily carried by the chassis of the vehicle.

3. An anti-splash guard comprising a flexible frame carrying a brush; said frame being composed of bars bent upward and inward at the ends, and connected together at said ends by a pivot; spring pistons between the said bars, said pistons holding the frame open and serving as buffers against external shock; rods pivotally mounted on brackets secured to a movable plate supporting the brush frame; springs secured, on the one hand, to the said rods, and on the other to the said brackets, for the purpose of keeping the brush frame in the vertical position, these springs returning the brush frame into the said position when, from any cause, it is pushed outward from the vehicle; and a second plate supporting the movable plate which is secured by uprights fastened on to the chassis of the vehicle.

4. An anti-splash guard comprising a flexible frame carrying a brush; means for supporting said frame consisting of rods pivotally mounted on brackets secured on a movable plate; springs attached to said rods and brackets keeping the brush frame in, or restoring it to the vertical position; spring buffer pistons between the bars forming the frame; a plate spring on the outer bar whereby to deaden any shock against said bar; said movable plate being mounted on a second plate which is carried by uprights secured to the chassis of the vehicle.

5. An anti-splash guard comprising a flexible frame carrying a brush, said frame being supported by rods pivotally mounted on brackets secured to a movable plate; springs attached to the supporting rods and the brackets; spring buffer pistons between the bars forming the sides of the brush frame; a plate spring on the outer bar; rollers with horizontal axes on the inner bar for the purpose of preventing the entire anti-splash guard from being dragged by the wheel when these rollers are brought into contact with the wheel; brackets, supporting the flexible and oscillating brush frame, being secured to a movable plate mounted on a second plate which is carried by uprights attached to the chassis of the vehicle.

6. An anti-splash guard comprising a flexible brush frame; rods pivotally mounted on brackets secured to a movable plate supporting said frame; springs attached to the brackets and supporting rods; spring buffer pistons between the bars forming the sides of the brush frame; a plate spring on the outer bar; rollers on the inner bar; a curved plate spring secured at the ends to the brush frame whereby to lift the latter on coming into contact with any obstacle on the road; the said brackets being secured on a plate which is mounted in a way which enables it to move vertically and to oscillate on a second fixed plate carried by uprights attached to the chassis of the vehicle.

7. An anti-splash guard comprising a flexible brush frame; rods pivotally mounted on brackets secured to a movable plate supporting said frame; springs attached to the supporting rods and the brackets; spring buffer pistons between the sides of the brush frame; a plate buffer spring on the outer bar; rollers on the inner bar; a curved plate spring secured at the ends to the brush frame, which frame is, moreover, supported at the two ends by spiral springs which tend to maintain the anti-splash guard in, and restore it to its horizontal position, the said springs being attached to the arms supporting the fixed plate on which the movable plate supporting the brush frame is adapted to move.

8. An anti-splash guard comprising a flexible brush frame; rods pivotally mounted on brackets secured to a movable plate and supporting said frame; springs connecting said rods and brackets; spring buffer pistons interposed between the sides of the brush frame; a plate buffer spring on the outer bar; rollers on the inner bar; a plate spring arranged below the frame and secured to the ends of same; spiral springs attached to fixed uprights also supporting the brush frame; a movable plate supporting the whole of the brush frame, said plate being provided with a slot engaging a stud on a fixed plate in such a way that the movable plate can be oscillated and move vertically on said stud; the said movable plate being also provided with guide lugs engaging in slots in the fixed plate; means being provided for supporting the said fixed plate on the chassis of the vehicle.

9. An anti-splash guard comprising a flexible brush frame being supported on a movable plate by means of rods pivotally mounted on brackets secured to the movable plate; springs connecting the supporting rods with the brackets; spring buffer pistons interposed between the sides of said frame; a plate buffer spring on the outer bar; rollers on the inner bar; a plate buffer spring underneath said frame; suspension springs connecting the ends of the brush frame with rods secured to the chassis of the vehicle; a movable plate supporting the entire brush frame, said plate engaging, by means of a vertical slot, with a stud on a fixed plate so that the movable plate can oscillate and also move vertically, on said stud; said movable plate being also provided with guide lugs engaging in slots in the fixed plate, which latter is rigidly secured to the chassis of the vehicle by means of vertical arms or rods secured to said chassis; the brush frame being covered by a waterproof fabric.

The foregoing specification of our anti-splash guard for motor vehicles, signed by us, this 31st day of March, 1919.

LUCIEN EMILE VASSEUR.
MICHEL TCHOUBRITCH.